United States Patent [19]
Widmayer

[11] 3,876,907
[45] Apr. 8, 1975

[54] PLANT GROWTH SYSTEM

[75] Inventor: Don F. Widmayer, Bethesda, Md.

[73] Assignee: Controlled Environment Systems, Inc., Rockville, Md.

[22] Filed: Apr. 2, 1973

[21] Appl. No.: 346,902

Related U.S. Application Data
[62] Division of Ser. No. 96,789, Dec. 10, 1970, abandoned.

[52] U.S. Cl. ............... 315/208; 47/DIG. 6; 47/58; 315/DIG. 5; 315/149
[51] Int. Cl. ......................................... H05b 37/00
[58] Field of Search ...... 47/DIG. 6, 58; 315/DIG. 5, 315/149, 151, 152, 156, 159, 208, 246, 258; 250/205, 206

[56] References Cited
UNITED STATES PATENTS

| | | | |
|---|---|---|---|
| 3,243,918 | 4/1966 | Machiedo | 47/1.4 |
| R21,907 | 9/1941 | Balsey | 315/151 |

OTHER PUBLICATIONS

Emerson et al. "A Separation of the Reactions in Photosynthesis by Means of Intermittent Light," Journal of General Physiology, pp. 391–421, Vol. 15, No. 4, March 20, 1932.

*Primary Examiner*—Alfred E. Smith
*Assistant Examiner*—Lawrence J. Dahl
*Attorney, Agent, or Firm*—Larson, Taylor & Hinds

[57] ABSTRACT

This invention relates to a method and apparatus for growing plant life under controlled conditions including gas discharge lamps with electronic means utilized to provide predetermined pulses of electric current to the lamps so that bursts of radiant energy are supplied to the plant life, these bursts of energy being of a duration in the order of microseconds and at a periodicity that is favorable to the plant growing processes. The radiant energy supplied to the plant life is within the spectral range required for photosynthesis and is uniform to the photoreceptors of the plant life.

14 Claims, 5 Drawing Figures

INVENTOR
DON F. WIDMAYER

BY *Larson, Taylor and Hinds*

ATTORNEYS

INVENTOR
DON F. WIDMAYER

PLANT GROWTH SYSTEM

This is a division, of application Ser. No. 96,789 filed Dec. 10, 1970 now abandoned.

This invention relates generally to a method and apparatus for growing plant life under controlled conditions and to a method and apparatus for growing plant life utilizing artificial light sources with the radiant energy being supplied to the plant life in predetermined bursts.

The use of artificial light sources as a substitute for, or a supplement to, the sun is becoming widely used by research scientists, commercial growers and hobbyists in the growing of plant life. In connection with the use of artificial lighting for plant growth fluorescent type lamps are more often employed than incandescent lamps since fluorescent lamps can be manufactured to provide a spectral energy distribution of radiant energy more closely matching the radiant energy absorbed by the plants and required for efficient photosynthesis. Furthermore fluorescent lamps are considerably more efficient in generating most of the wavelengths of radiant energy required by a plant without the attendant near infrared heat energy that is emitted by an incandescent lamp. More recently higher pressure gas discharge lamps have been developed which are more efficient and make it economically feasible to commercially grow plant seedlings without any natural light.

While it has become commercially feasible to grow seedlings without any natural light because of the development of more efficient lighting systems and other factors, it has not been economically feasible to utilize artificial lighting systems exclusively for commercial crops being grown to maturity because of the growing area required per plant. This, obviously, is due to the power costs inherent in operating an artificial lighting system continuously during the relatively long growing period of the plant life, where until the plant is fully grown only a fraction of the totally irradiated growing area is effectively utilized. Hence, artificial lighting systems for growing plants has been limited in the past to growth of seedlings or scientific investigations and hobbyists or where power costs become secondary.

According to the present invention there is provided a method and apparatus for utilizing an artificial lighting system for growing plants wherein predetermined bursts of radiant energy are supplied to the plant life of a duration, intensity and periodicity such that the photosynthesis process of the plant life is maintained at a reasonably high level and the substantial power costs attendant with prior art artificial lighting systems are reduced to a fraction of their previous values because the average power consumed is much lower. Thus, by reason of the development of the present invention, for the first time artificial lighting systems for growing plant life on a large scale commercial basis becomes economically feasible.

In order that the nature of and advantages of the present invention may be fully appreciated it is advisable to review certain aspects of the photosynthesis process.

In the photosynthesis process the photo receptor system of the plant absorbs light photons from the radiant energy source and this absorbed energy is transferred within the plant to cells which convert this energy into the chemical energy necessary for the photosynthesis process.

It is well known that the photo receptor part of the process is very rapid whereas the chemical synthesis part of the process is much slower. The entire process of an electron absorbing or becoming excited by a light photon and reverting back to its lower energy state is less than (10) nanoseconds. When an electron of a chlorophyll molecule having absorbed a photon reverts to its lower energy state, the absorbed energy is either reradiated as longer wave length energy or utilized in the photosynthetic process at a special energy transfer center in the plant structure. It is at this center that the chemical conversion process takes place. As a possible relative index of the chemical processing time frames, one experiment showed that 50% of the oxygen, a by-product of the chemical process, was given up in the first 8 milliseconds following a very brief but intense flash of light and the complete reaction took a total of 240 milliseconds.

In an article entitled "How Light Interacts with Living Matter" appearing in the Sept. 1968 edition of Scientific American, Dr. Sterling B. Hendricks, Chief Scientist for the Mineral Nutrition Laboratory, U.S.D.A., States that the light photon energy is transferred from the absorbing chlorophyll molecules to a relatively few molecules that act as energy-trapping sinks. Further that there is about one energy trapping sink for each 500 chlorophyll molecules. In addition this ratio constitutes a bottleneck insofar as the energy transfer system is concerned since energy arrives at the so called sink faster than it can be utilized in the chemical process that follows. This buttresses previous findings that most plants are very inefficient in utilizing the available energy for photosynthetic purposes.

Thus, after some base level of intensity is reached the photons available from a continuous light source of any type cannot be utilized efficiently by a plant. This has led to research investigating the response of plant life to intermittent light, that is, flashing or cyclic lighting. This research was directed at photoperiodicity and specific plant responses to short cycles of alternating light of periods ranging from days down to milliseconds on the milliseconds off. The researcher has been limited in this area by the practicality of turning a radiant energy source on and off at low duty cycles and high frequencies. Photo flash units lack the repetitive capability and life. Incandescent lamps, by their very dependence on the phenomena of incandence, eliminate themselves as a possible candidate source for controlled high frequency pulsing. Fluorescent lamps on commercial flashing ballasts only alternate in an uncontrolled fashion at a frequency perceptible to the human eye and have other shortcomings. The newer medium pressure gas discharge lamps without design modification can be eliminated as they cannot be re-ignited for several minutes if turned off and have severe spectral shifts with pressure changes. Various mechanical devices have been utilized to interrupt a light which is continuously on at frequencies down to a few milliseconds. However, in such cases the light in effect wipes across the surface of the plant rather than providing controlled bursts of radiant energy in wave front formation.

According to the present invention one or more gas discharge lamps is provided with an electronic control circuit which permits the lamps to be energized to produce pulses of radiant energy, these pulses being of a duration in the microseconds range (i.e. less than a millisecond) and at a periodicity that is suitable to plant growth. The radiant energy supplied is within the spectral range required for photosynthesis and the duration and periodicity of the pulses or bursts is such that a higher ratio of absorbed energy utilization for photosynthesis is achieved than would be achieved with plants grown under continuous radiant energy. The bursts are uniform as compared to systems where light traverses a plant so as to provide radiant energy to the photoreceptors of the plants' absorbing system simultaneously.

In my prior U.S. Pat. No. 3,422,310 issued Jan. 14, 1970 and in my pending U.S. Pat. application Ser. No. 818,375 filed Apr. 22, 1969, there are disclosed methods and means for controlling the current to fluorescent lamps. As is well known in the art, fluorescent lamps have a negative resistance characteristic and generally a ballast is utilized to limit the current flowing through the tubes once the arc is struck. In the above mentioned patent and patent application there is disclosed means for controlling the current flow in load devices such as fluorescent tubes independently of the electrical resistance characteristics of the load device. Systems such as disclosed therein may be utilized in combination with the pulsing means disclosed herein and the subject matter of the above mentioned patent and patent application is incorporated by reference herein.

It is therefore the principal object of this invention to provide a novel method and apparatus for growing plants by the plants utilizing predetermined pulses of radiant energy. The apparatus would provide these pulses at a rate and duration to achieve a higher ratio of energy utilization for photosynthesis than energy re-radiated by the plants or utilized for other plant processes as compared to the same utilization ratio of plants grown under continuous radiant energy.

It is a further object of the present invention to provide a method and apparatus for growing plants under controlled conditions utilizing bursts of radiant energy whereby the power requirements for growing plants with artifical lighting on a large scale commercial basis is reduced significantly so as to become economically feasible.

Other objects and many of the attendant advantages of the present invention will become more readily apparent upon consideration of the following detailed specification in connection with the accompanying drawings.

Description of the Preferred Embodiments

Figure 1:
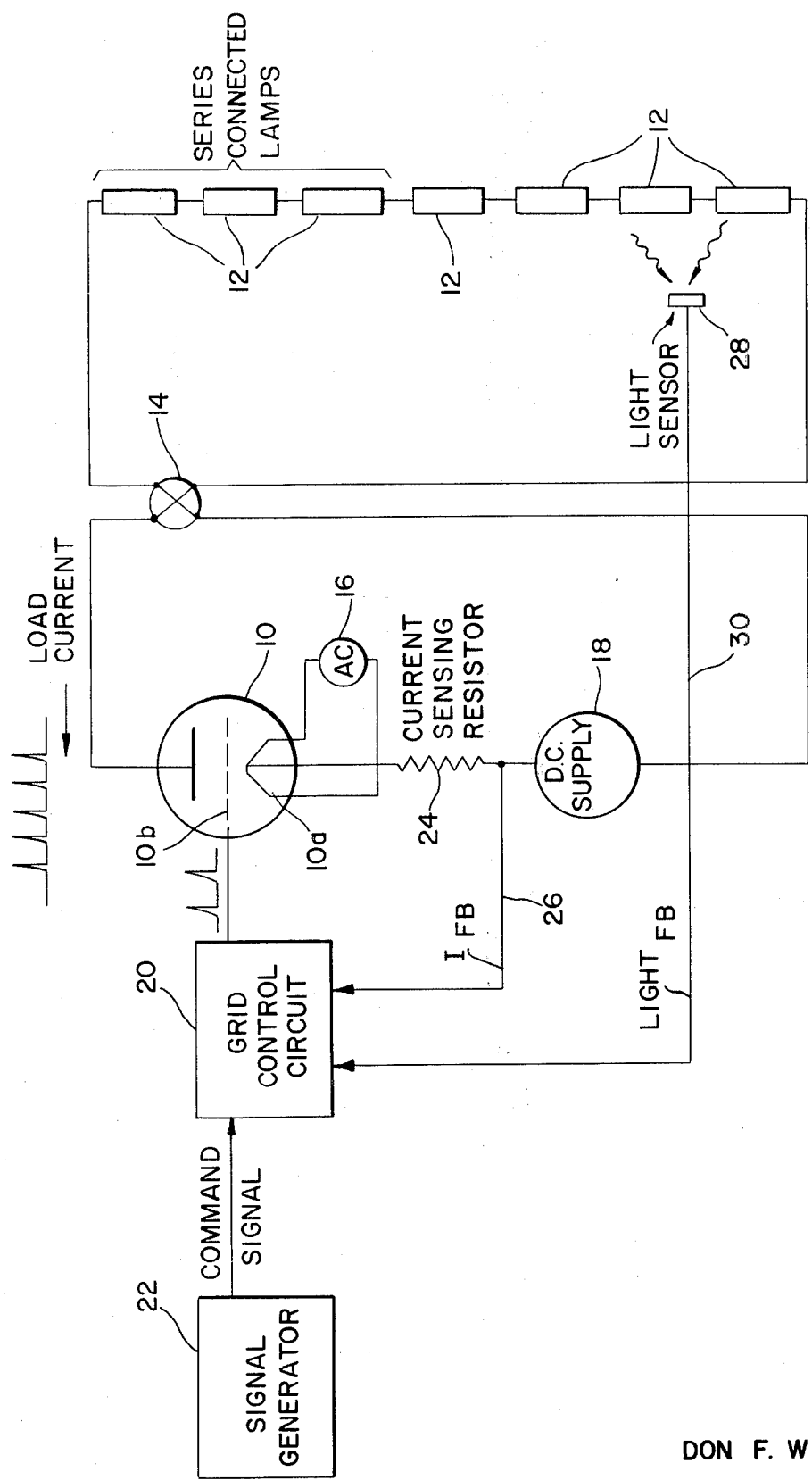
FIG. 1 is a schematic circuit diagram of a first embodiment of a digital lighting system in accordance with the present invention.

Referring to FIG. 1, there is shown a simplified digital lighting circuit for plant growth control. A power triode 10 is connected in series with a bank of series-connected fluorescent lamps denoted 12 through an optional polarity reversing device or switch 14. Polarity reversing device 14 is used to combat ion migration problems encountered with the use of a D.C. source, these problems being most severe at high current drive levels.

The filament of the cathode 10a of triode 10 is heated by a heater circuit represented by an A.C. source denoted 16. The heater circuit may take a number of different forms and reference is made to the above-identified co-pending application Ser. No. 818,375 for a discussion of a suitable heater circuit. A D.C. source 18 is connected in series with triode 10 and may be constituted by a rectified A.C. supply voltage which has been stepped up to a suitable level.

A grid control circuit 20 is connected to the grid 10b and cathode 10a of triode 10 to control the grid to cathode voltage. A signal generator 22 produces a command signal which is connected to one input of grid control circuit 20. Grid control circuit 20 provides the required shaping and amplification of the command signal and, in addition, may modify this signal in accordance with the actual current flow in the lamp load 12 and/or the light output of the lamps 12. The current flow in the lamp load 12 is sensed by a sensing resistor 24 connected in series with triode 10, and a current feedback path 26 is connected as a further input to grid control circuit 20. Similarly, a light sensor 28 which senses the output of lamps 12 is connected through a light feedback path 30 as a further input to grid control circuit 20. Reference is made to the aforementioned U.S. Pat. No. 3,422,310 as well as the aforementioned patent application Ser. No. 818,375 for a description of suitable current feedback and light feedback techniques.

Figure 2:
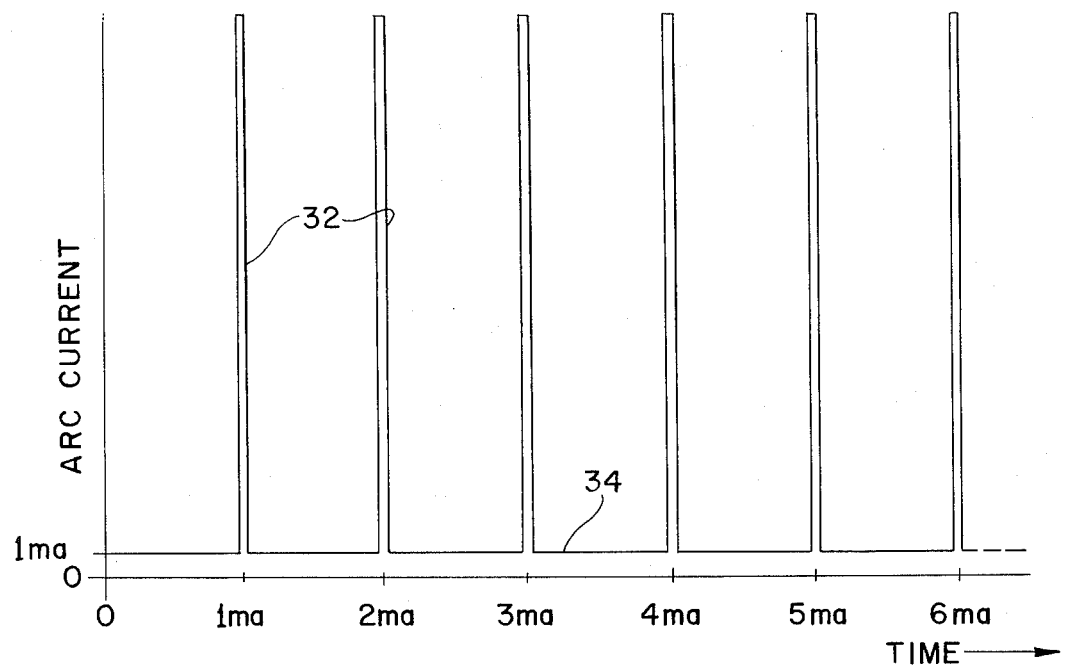
FIG. 2 is a diagram illustrating the arc current waveform of the lamp lead of FIG. 1.

As indicated in FIG. 1, grid control circuit 20 provides a train of voltage pulses to the grid 10b and the cathode 10a of triode 10, the grid to cathode voltage of triode 10 controlling the current conduction through triode 10 so that the output current waveform of triode 10 corresponds generally to that of the pulse input. More specifically, as shown in FIG. 2, an arc current waveform is produced which comprises a series of relatively high amplitude, short duration pulses 32. A typical waveform is shown in FIG. 2 wherein the pulses 32 are 20 microseconds in duration and occur every millisecond, i.e., 1,000 microseconds, so that an OFF-ON ratio of 50 to 1 is provided. However, it will, of course, be appreciated that the pulsewidth of the pulses, the frequency of the pulses and the OFF - ON ratio of the pulses are all variable and the values set forth are merely exemplary.

As shown in FIG. 2, the pulses 32 may "ride" a very low level base current 34 (1 milliampere in the given example) which serves as a "keep-alive" current for the lamps 12 to maintain the lamp 12 in partially ionized state.

It will be appreciated that with pulse duration of microseconds "on" at frequencies in the microsecond or millisecond ranges or stated differently, with duty cycle on to "off" ratios of one to 10, one to 50 or even one to several hundred, the power and power handling equipment required will be decreased as compared with continuous power systems. In fact, the power requirement reductions are such as to make feasible the use of the system of the invention for irradiation of large growing areas. Further, the use of duty cycles and frequencies in question means that the light output, while being supra-liminal to plants, may be sub-liminal to the human eye depending on the pulse frequency. Further, as discussed above, "flooding" of the plants' energy sinks substantially reduced.

Figure 3:
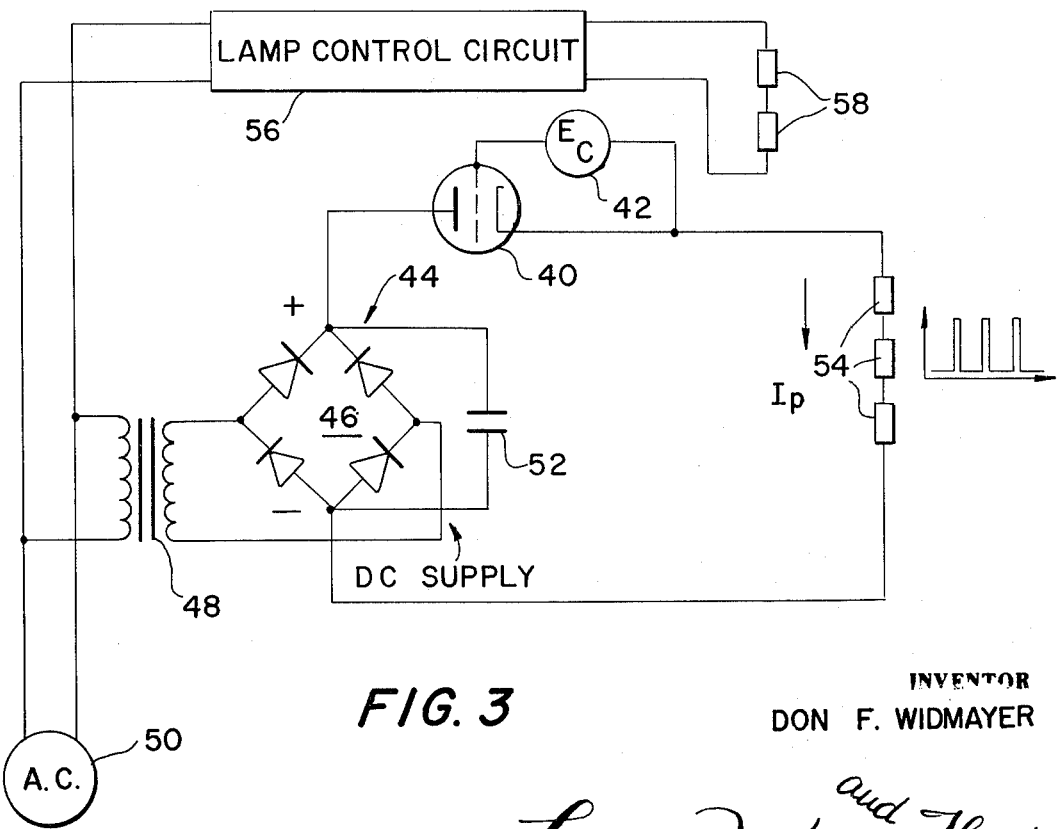
FIG. 3 is a schematic circuit diagram of a second embodiment of the invention.

Referring to FIG. 3, there is illustrated an alternate embodiment of a lamp control circuit in accordance with the invention. The circuit of FIG. 3 is similar to a so-called "hard tube pulser" used in radar and includes a triode 40 and a grid control circuit represented by source 42 which provides a control voltage $E_c$. A D.C. supply 44 is formed by a full wave rectifier 46 connected to an A.C. source 50 through a transformer 48, a smoothing capacitor 52 being connected across the D.C. terminals of rectifier 46. The duty cycle, wave shape and period of the current flowing through a bank of lamps 54 connected in series with triode 40 are a function of the control voltage produced by grid control circuit 42. Because, as pointed out hereinabove, the grid to cathode voltage of triode 40 determines the current conduction of triode 40, grid control circuit 42 can take the form of a general purpose variable duty cycle square wave or other function generator.

In operation, the circuit of FIG. 3 functions similarly to the circuit of FIG. 1, grid control circuit 42 controlling the duty cycle, period and amplitude of the load current flowing through tube 40 and hence through radiant energy producing lamps 54. Further, as in the circuit of FIG. 1, suitable light-to-voltage or light-to-current transducers may be provided, together with suitable feed back circuitry, to control the current conduction through lamps 54 as a function of the radiant energy output of the lamps 54 where closer control of the output intensity of the lamps is required or desired.

It is noted that, as shown in FIG. 3, a further lamp control circuit 56 can be employed to provide a dual circuit for photosynthesis studies. For example, triode 40 could drive lamps 54 with a spectral energy distribution in the blue region of the photosynthethetic or chlorophyll'(s) absorption curves. When pulsed on the blue light would activate photosystem or photoact I of the photosynthetic process within the plant material. Circuit 56 would drive a bank of lamps 58 such that light from only red energy band will be provided to activate the photosystem or photo act II in the plant material. By controlling the duration of the "red" and "blue" pulses and the time delay between the times when the pulses are produced, separation of the two light "acts" in the photosynthetic process can be accomplished thereby providing a useful tool towards understanding the photosynthetic process.

Figure 4:
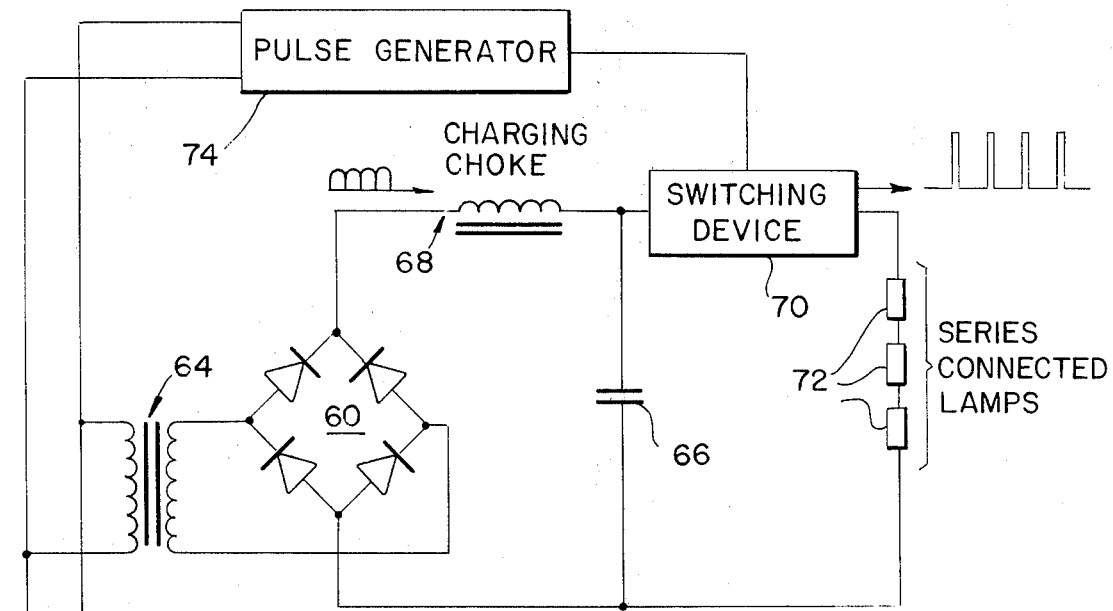
FIG. 4 is a schematic circuit diagram of a third embodiment of the invention.

It should be pointed out that in many specific applications the duty cycle, period and amplitude of the control pulses will be determined and then fixed by design. For such applications, a simplified system such as shown in FIG. 4 might be preferable to those previously discussed particularly from an economic standpoint. The circuit of FIG. 4 is similar to a so-called "line type pulser" used in radar applications and employs D.C. resonant charging techniques. Referring to FIG. 4, a full wave rectifier 60, connected to an A.C. source 62 through a transformer 64, provides a full wave rectified output voltage. As indicated this voltage is used to charge an energy storage capacitor 66 through a charging inductance or choke coil 68. A switching device 70 connected to the output of the resonant circuit formed by capacitor 66 and choke 66 discharges the energy stored by capacitor 66 into a load formed by a plurality of series-connected lamps 72. Switching device 70 may be a solid state control device such as a transistor or thyristor or, For that matter, a vacuum or gas tube. Because in principle, the charging time of the energy storage capacitor 68 is relatively long (although less than the interpulse period) the charging is theoretically accomplished with no dissipation.

The circuit of FIG. 4 could be used in a plant growing system wherein power and equipment costs are of prime concern, in contrast to the system of FIGS. 1 and 3 wherein "controllability" is of paramount interest. Of course, where the growing beds to be irradiated are fields or large enclosures a large number of lamps would be used, the lamps being typically strung overhead every few inches. Larger systems mean higher power voltages hence tubes would probably be more practical. Transistor or thyristor switching or control would be useful in small single or few lamp systems such as a home garden hobbyist might employ. Where switching device 70 comprises a transistor or thyristor, a suitable pulse generator or triggering device 74, powered from A.C. source 62, would be employed to trigger switching device 70. It will be appreciated that any of a number of triggering or control circuits could be used for this purpose and, for example, a zero voltage switch integrated circuit such as the PA 424 manufactured by the General Electric Company could be employed, such a device producing a pulse trigger for a thyristor (SCR) each time the A.C. primary power crosses zero and hence discharging energy storage capacitor 66 down to the arc extinction or low current level of the lamps 72 at twice the A.C. line frequency.

Figure 5:
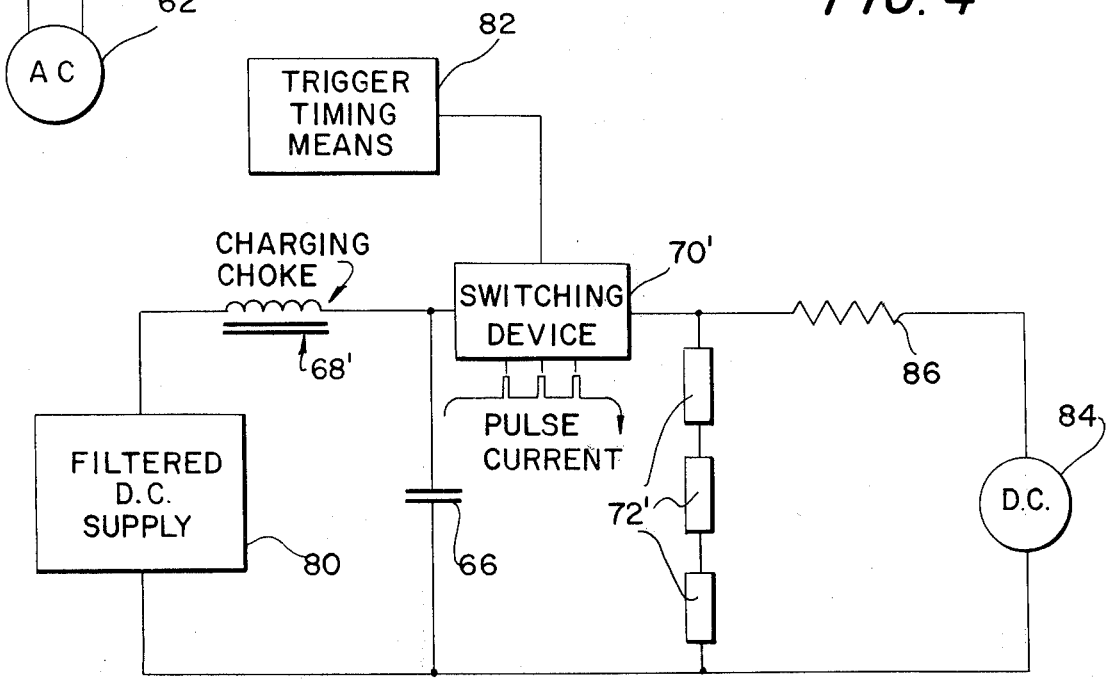
FIG. 5 is a schematic circuit diagram of a fourth embodiment of the invention, similar to that of FIG. 4.

Although the circuit of FIG. 4 provides synchronous A.C. line triggering of switching device 70, asynchonous switching or triggering could also be employed. Referring to FIG. 5, a circuit similar to that of FIG. 4 is shown and like elements in FIG. 5 have been given the same numbers with primes attached. In FIG. 5, the full wave rectified A.D. wave form produced in FIG. 4 has been replaced by a D.C. voltage produced by a filtered D.C. supply 80 thus permitting asynchronous line switching under the control of an independently powered trigger timing device 82. Further, because it is conceivable that continuous low level current flow in the lamps 72' might be desirable to maintain the lamps 72' partially ionized at all times, a further D.C. supply 84 and an associated current limiting resistor 86 are provided to produce such a current, which might be on the order from a few hundred microamperes to a few milliamperes.

Although the invention has been described with respect to exemplary embodiments thereof, those skilled in the art will appreciate that variations and modifications in these exemplary embodiments may be effected without departing from the scope and spirit of the invention.

I claim:

1. An apparatus for growing plant life under controlled conditions comprising, in combination, a plurality of series-connected fluorescent lamps operating in the arc discharge region, and circuit means providing a current source for energizing said lamps, said circuit means including a high frequency active electronic switching means for electronically pulsing said lamps on and off cyclicly so as to provide light pulses which are of a uniform, controlled duration of less than 1 millisecond, the light pulses being uniform bursts of radiant energy and the ratio of the duration of the cycle to the duration of a pulse being at least ten to one.

2. An apparatus according to claim 1 wherein switching means includes a tube pulser connected in the circuit means for energizing said fluorescent lamps.

3. An apparatus according to claim 1 wherein the circuit means further includes a condenser connected in parallel with said switching means and charging choke connected in series with said switching means.

4. An apparatus for growing plant life under controlled conditions comprising, in combination, a plurality of series-connected fluorescent lamps operating in the arc discharge region, and circuit means providing a current source for energizing said lamps, said circuit means, including a triode and means for controlling the voltage on the grid of said triode, for electronically pulsing said lamps on and off cyclicly so as to provide light pulses which are of a uniform controlled duration of less than 1 millisecond, the ratio of the duration of a cycle to the duration of a pulse being at least ten to one.

5. An apparatus as claimed in claim 1 wherein said circuit means further includes a source of D.C. voltage, and an energy storage capacitor connected to said source for storing energy and for discharging said energy through said lamps responsive to said switching means changing state.

6. An apparatus as claimed in claim 5 wherein said circuit means further comprises a control circuit for controlling the state of said electronic switching means, and a charging coil connected between said source said energy storage capacitor.

7. An apparatus as claimed in claim 6 wherein said source comprises a filtered D.C. source.

8. An apparatus as claimed in claim 6 wherein said source comprises a full wave rectifier connected to an A.C. source, said circuit means further comprising means for connecting said control circuit to said A.C. source to provide synchronous control of said electronic switching means.

9. An apparatus as claimed in claim 6 further comprising means comprising a further D.C. source and a current limiting resistor, connected in series with said lamps, for providing a minimum current flow through said lamps.

10. An apparatus as claimed in claim 4 wherein grid voltage controlling means includes feedback means for sensing at least one parameter associated with said lamps.

11. An apparatus as claimed in claim 10 wherein said parameter is light intensity and said feedback means includes a light sensing means.

12. An apparatus as claimed in claim 10 wherein said parameter is the load current through said lamps and said feedback means includes a sensing resistor.

13. An apparatus as claimed in claim 4 wherein said voltage controlling means comprises a grid control circuit for controlling the voltage on the grid of said triode and a signal generator for producing a command signal for controlling the operation of said grid control circuit.

14. An apparatus as claimed in claim 1 wherein said switching means provides switching pulses to said lamps of substantially square waveform.

* * * * *